Jan. 27, 1970 A. G. CHYNOWETH 3,492,489

GUNN-TYPE ELECTROLUMINESCENT DEVICE

Filed Jan. 5, 1965 2 Sheets-Sheet 1

INVENTOR
A. G. CHYNOWETH
BY David P. Kelley
ATTORNEY

Jan. 27, 1970 A. G. CHYNOWETH 3,492,489

GUNN-TYPE ELECTROLUMINESCENT DEVICE

Filed Jan. 5, 1965 2 Sheets-Sheet 2

United States Patent Office 3,492,489

Patented Jan. 27, 1970

3,492,489

GUNN-TYPE ELECTROLUMINESCENT DEVICE

Alan G. Chynoweth, Summit, N.J., assignor to Bell Telephone Laboratories, Incorporated, New York, N.Y., a corporation of New York

Filed Jan. 5, 1965, Ser. No. 423,527

Int. Cl. G02f *1/28;* H01d *39/12*

U.S. Cl. 250—217 7 Claims

ABSTRACT OF THE DISCLOSURE

Electroluminescent logic or display devices comprise a member of N-type III–V material which has a voltage threshold of luminescence. A matrix array of conducting strips on the material allows selective luminescence at the cross points to create a display.

This invention relates to display and/or switching devices, and more particularly, to electroluminescent display devices.

In general, electroluminescent display or switching devices are of two types, the phosphor type and the semiconductor junction type. The phosphor type usually comprises a phosphor powder embedded in a dielectric material having a backing plate of conducting material. Light is emitted under the influence of a changing electric field, such as alternating current, and the light intensity is governed by the magnitude of the alternating current field. Sustained emission is not possible with a steady state or direct current field, nor does the application of a direct current field in conjunction with an alternating current field materially affect the light produced by the alternating or changing field.

When the phosphor type is to be used as a display or switching device, it is necessary to form the backing panel of a number of discrete conductiong elements, each one defining a single "bit" in the display or switching matrix. Where high resolution is desired, these elements must be extremely small, and, since electrical connection must be made to each one, the fabrication problems involved become enormous. Obviously an upper limit is placed upon the resolution obtainable with a given raster or display area. In addition, the problem of exciting these separate bits or elements to the proper degree of intensity of emitted light necessitates complex circuit arrangements.

In semiconductor junction type electroluminescent devices, when a direct current voltage above a certain threshold value is applied across the junction, an easily measurable amount of light is emitted. The intensity of the light can be controlled, to some extent at least, by the magnitude of the applied voltage. When used as a display or switching device, the junction type requires as many discrete junctions as there are elements or bits in the array, with connections made to each junction or element, As was the case with the phosphor type arrangement, there is an upper limit placed on the number of discrete junctions in a given sized array, and high resolution is quite difficult to obtain. The difficulty of making individual connections to each junction further governs the degree of resolution obtainable.

While it is highly desirable to have high resolution solid state electroluminescent display or switching devices, it is obvious from the foregoing that present devices increase in complexity with increasing resolution, and the limits of practicability necessarily fall short of the desired resolution, where the desideratum is high resolution.

It is an object of the present invention to eliminate to a large extent the interdependence of fabrication ease and resolution in an electroluminescent display or switching device.

The present invention is based upon the discovery that certain materials, such as, for example, gallium arsenide, or a mixture of gallium arsenide and gallium phosphide (GaAs,P) in crystalline form, luminesce upon the application of a direct current voltage beyond a certain threshold value and the intensity of the emitted light varies directly with variations in applied voltage above the threshold value. The threshold voltage, which represents the onset of current oscillations, itself depends upon the type of material and the concentration of impurities therein, hence it may be controlled within certain limits during the manufacture of the crystal. The onset of current oscillttions is known as the Gunn effect, and the frequency of the oscillatory output is governed by the dimensions of the crystal, since the effect is directly related to transit time. The light output on the other hand, is substantially in--dependent of the dimensions of the crystal, and the wavelength of the light is determined by the energy gap of the material.

In an illustrative embodiment of the invention, a flat crystal of the proper material, such as that mentioned in the foregoing, has affixed to one face thereof a plurality of parallel transparent conducting strips or wires, and to the other face thereof a second set of parallel conducting wires or strips which may or may not be transparent, oriented at right angles to the first set. The intersections of the strips define the crosspoints or elements of a matrix array, and the number of elements in the array, and hence the resolution thereof, depends upon the wire or strip dimensions and spacing. With present day plating techniques, it is possible to make an extremely high resolution display by evaporating the conducting strips onto the faces of the crystal, thereby, as is known in the art, forming a plurality of ohmic contacts, i.e., contacts across which the voltage drop is linearly proportional to current, regardless of current direction.

Bias voltages are applied to the two faces of the crystal so that each cross point is biased to a voltage value slightly less than the threshold voltage characteristic of the material. Display or switching information is applied to a signal translator which separates row signals from column signals, and then to row and column drivers, which apply the translated signals to the appropriate row and column. Application of a row signal alone does not produce a voltage in excess of the threshold value, nor does application of a column signal alone. However, when both columns and rows have signal voltages applied thereto, the material will luminesce at the intersections of those rows and columns having sig ials applied thereto. As a consequence, there can be simultaneous activation of any or all elements or bits in the matrix to produce an electroluminescent display or switching pattern.

In a display device where the light generated at the crosspoints is the visible region of the optical spectrum, the display may be viewed outright, or optical aids such as lenses may be used. Where the emission is not in the visible region but in the near infrared, the display may be focused onto an infrared sensitive element for example, or a bank of such elements. Likewise in switching applications, the display may be focused onto a bank of light or infrared sensitive elements.

It is a feature of the present invention that an optical display of high resolution is achieved utilizing a single conductivity type semiconductor crystal.

The features and other objects of the present invention will be more readily apparent from the following detailed description, taken in conjunction with the accompanying drawings, in which.

Figure 1:
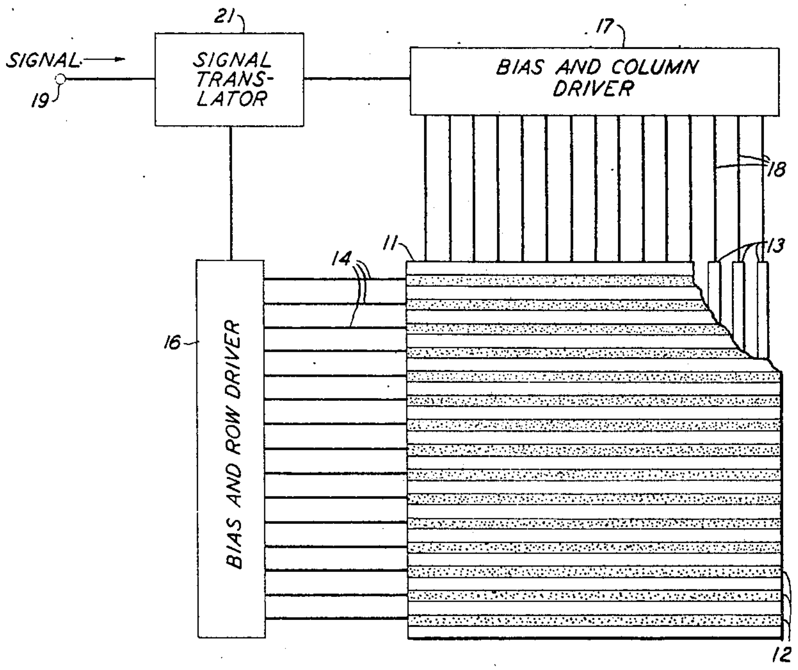
FIG. 1 is a view of one embodiment of the present invention.

Turning now to FIG. 1, there is shown a display arrangement utilizing the principles of the present invention. The arrangement of FIG. 1 comprises a flat crystal 11 of material such as n-type gallium arsenide or other suitable material which, upon application of a voltage of sufficient magnitude, breaks into electrical oscillations i.e., now commonly referred to as the Gunn effect, which are accompanied by the optical emission of radiation. As is characteristic of Gunn type oscillators, the direction of the applied voltage is immaterial, the threshold of oscillation remaining the same for either direction of applied voltage. Materials of the III–V class have proven to be especially suitable. On one face of crystal 11 are deposited, by evaporation or other suitable means a plurality of semi-transparent parallel conducting strips 12 of gold, stannous chloride, or other suitable material, and on the other face are parallel strips 13 oriented at right angles to strips 12 and deposited in the same manner. It is only necessary that those strips on the side of the crystal which is to be viewed be transparent.

Attached to each of the strips 12 by means of conductors 14 is a row driver 16 which may include a bias source. In like manner, a column driver and bias supply 17 is connected to strips 13 by way of conductors 18. Drivers 16 and 17 are supplied with signals from a signal input 19 and a signal translator 21. Signal translator 21 performs the function of separating the vertical and horizontal components of the signal and directing these components to the drivers 16 and 17 which in turn apply a voltage to the appropriate rows and columns. Translator 21 and drivers 16 and 17 may take any one of a number of forms well known in the art, the arrangement shown here being by way of illustrating one system for actuating the rows and columns of a matrix.

Figure 2:
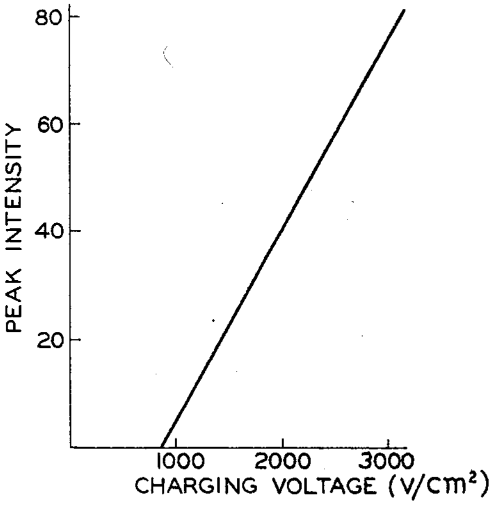
FIG. 2 is a graph demonstrating the emission characteristics of the crystal of the present invention.

In FIG. 2 there is depicted a graph of electroluminescent intensity versus applied voltage for a material such as gallium arsenide. From FIG. 2 it can be seen that for a voltage difference of approximately 900 volts at the intersection of a row and a column, or, approximately 3,000 volts per centimeter, the crystal 11 commences to emit light at the intersection only. The applied voltage at the onset of the electrical oscillations is called the threshold voltage. As can be seen from FIG. 2, there is no light emission for voltages below this threshold voltage, in contrast to the aforementioned prior art devices.
The intensity of the illumination increases as the applied voltage is increased, as can be seen from FIG. 2. In a Gunn effect device, traveling high field domains are created when the threshold is exceeded. These high fields produce impact ionization of carriers in the material, which subsequently recombine to produce recombination radiation whose intensity varies with applied voltage and the wavelength of which depends upon the band gap of the material.

As a consequence, the arrangement of FIG. 1 constitutes a display device capable of producing varying intensity across the display. Where the signal voltages are not of sufficient magnitude to reach the threshold, the rows and columns may be biased as shown in FIG. 1 or by other suitable means, to a point just sufficiently below threshold to prevent a signal voltage on a row only or a column only from producing oscillations, but to insure oscillation at the intersection of a row and column when a signal is applied to both.

Figure 3:
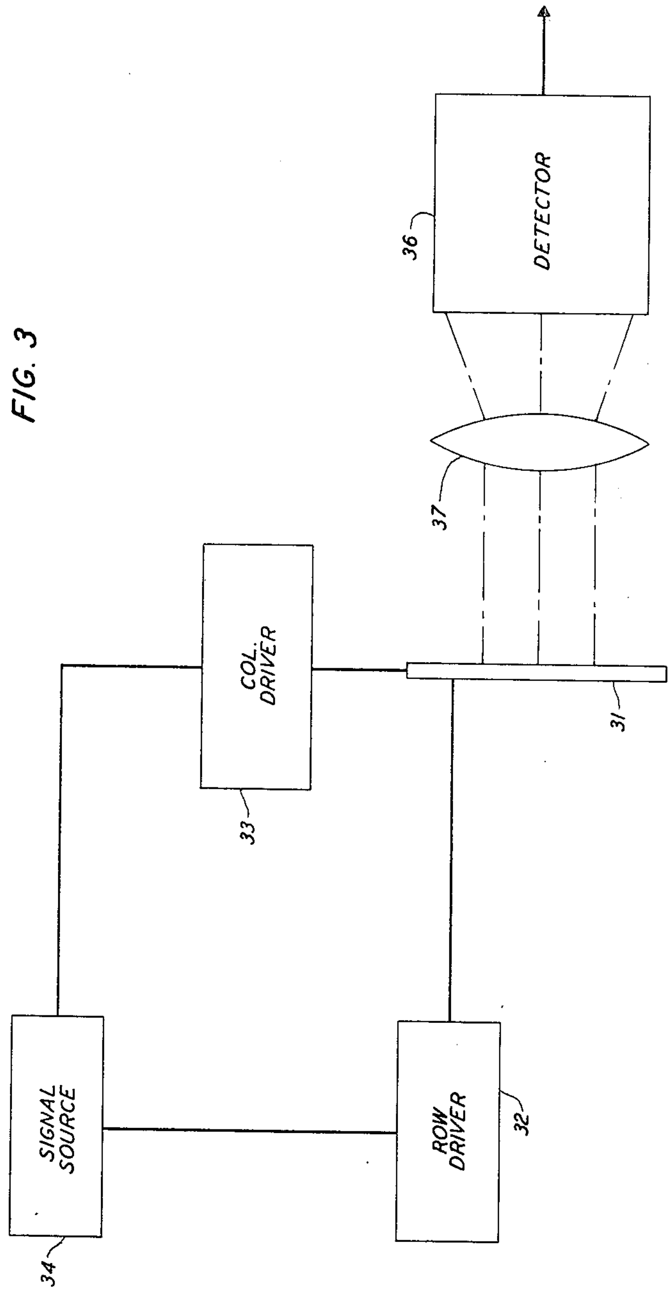
FIG. 3 is a diagrammatic view of another embodiment of the present invention.

The arrangement of FIG. 1 is intended to illustrate a simple visual display device. Where emission occurs in the infrared region of the spectrum or where a switching arrangement is desired, the arrangement of FIG. 3 is more suitable. In FIG. 3, a crystal 31 is supplied with signals from row and column drivers 32 and 33 respectively, which receive their signals from a signal source 34, which may also include a signal translator, as in FIG. 1. The activated or oscillating points or elements in the array are imaged on a detector 36 by a lens system 37. Detector 36 may comprise a plurality of infrared sensors, or photosensitive devices, which produce an electrical output for utilization in switching, or which may convert infrared to visual in display arrangements.

From the foregoing examples, it can be seen that an extremely simple, high resolution display or switching arrangement is possible utilizing the principles of the invention. Numerous other arrangements may occur to workers skilled in the art without departure from the spirit and scope of the invention.

What is claimed is:

1. An electroluminescent device comprising a single crystal member of N-type material of the III–V class, such as gallium arsenide or a mixture of gallium arsenide and gallium phosphide, said material being characterized by a voltage threshold of oscillation and luminescence which is independent of the voltage direction, said member having a pair of parallel faces, a first plurality of conducting members making ohmic contact with one face of said member, a second plurality of conducting members making ohmic contact with the other face of said member and oriented at right angles to the first plurality of conducting members, and means for selectively applying voltages to the conducting members to produce a voltage exceeding the threashold of luminescenec of the material at the intersection of at least one pair of right angle oriented conducting members.

2. An electroluminescent device comprising a single crystal member of N-type III–V material such as gallium arsenide or a mixture of gallium arsenide and gallium phosphide, said material being characterized by a voltage threshold of oscillation and luminescence which is independent of the voltage direction, said member having a pair of parallel faces, a first plurality of semitransparent conducting members contacting one face of said member, a second plurality of semitransparent conducting members contacting the other face of said member and oriented at right angles to the first plurality of conducting members, said members forming ohmic contacts on said crystal member, means for selectively applying voltages to the conducting members to produce a voltage in excess of the threshold of luminescence of the material at the intersection of at least one pair of right angle oriented conducting members, and means for detecting optical radiation from the point of intersection of said one pair.

3. An elecroluminescent device as claimed in claim 1 wherein said semiconductor member is of n-type gallium arsenide.

4. An electroluminescent device as claimed in claim 1 wherein said semiconductor member is a mixture of n-type gallium arsenide and gallium phosphide.

5. An electroluminescent device as claimed in claim 2 wherein said voltage applying means include means for biasing said conducting members to a value slghtly less than said threshold.

6. An electroluminescent device as claimed in claim 2 wherein said detecting means comprises a plurality of infrared sensitive devices.

7. An electroluminescent device as claimed in clam 2 wherein said detecting means comprises a plurality of photosensitive devices.

References Cited

UNITED STATES PATENTS

| | | |
|---|---|---|
| 2,877,376 | 3/1959 | Orthuber. |
| 2,883,582 | 4/1959 | Hanlet. |
| 2,892,968 | 6/1959 | Kallman et al. |
| 3,223,886 | 12/1965 | Glaser. |

OTHER REFERENCES

"Instabilities of Current in III–V Semiconductors" by J. B. Gunn, IBM Journal, April 1964, pp. 141–153.

Electroluminescence by H. K. Henisch, The MacMillan Co., New York, 1962, pp. 137–139, 211–213.

Electroluminescence by H. K. Henisch, The MacMillan Co., New York, 1962, pp. 29–32.

RALPH G. NILSON, Primary Examiner

MARTIN ABRAMSON, Assistant Examiner

U.S. Cl. X.R.

313—108; 315—169